US008957916B1

(12) United States Patent
Hedman et al.

(10) Patent No.: US 8,957,916 B1
(45) Date of Patent: Feb. 17, 2015

(54) DISPLAY METHOD

(75) Inventors: Elliott Bruce Hedman, Cambridge, MA (US); Liang-Yu Tom Chi, San Francisco, CA (US); Aaron Joseph Wheeler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 226 days.

(21) Appl. No.: 13/429,026

(22) Filed: Mar. 23, 2012

(51) Int. Cl.
*G09G 5/00* (2006.01)

(52) U.S. Cl.
USPC ............................................. 345/633; 345/7

(58) Field of Classification Search
USPC ........................................................ 345/633
See application file for complete search history.

(56) References Cited

U.S. PATENT DOCUMENTS

| | | | |
|---|---|---|---|
| 5,815,411 A * | 9/1998 | Ellenby et al. ................ 702/150 |
| 7,764,293 B2 * | 7/2010 | Kakuta et al. ................. 345/619 |
| 2002/0044152 A1 * | 4/2002 | Abbott et al. ................. 345/629 |
| 2007/0035562 A1 * | 2/2007 | Azuma et al. ................. 345/633 |
| 2010/0027888 A1 * | 2/2010 | Katano et al. ................. 382/173 |
| 2011/0221669 A1 * | 9/2011 | Shams et al. .................. 345/156 |
| 2011/0221793 A1 * | 9/2011 | King et al. .................... 345/690 |
| 2011/0249122 A1 | 10/2011 | Tricoukes et al. |
| 2011/0279355 A1 | 11/2011 | Yasue et al. |
| 2012/0062445 A1 * | 3/2012 | Haddick et al. ................... 345/8 |
| 2012/0092369 A1 * | 4/2012 | Kim et al. ..................... 345/633 |
| 2012/0120103 A1 * | 5/2012 | Border et al. ................. 345/633 |
| 2012/0194552 A1 * | 8/2012 | Osterhout et al. ............ 345/633 |
| 2012/0200601 A1 * | 8/2012 | Osterhout et al. ............ 345/633 |
| 2012/0293548 A1 * | 11/2012 | Perez et al. ................... 345/633 |
| 2013/0286236 A1 * | 10/2013 | Mankowski ............... 348/222.1 |
| 2013/0335301 A1 * | 12/2013 | Wong et al. ....................... 345/8 |

FOREIGN PATENT DOCUMENTS

| | | |
|---|---|---|
| AU | 2011204946 | 12/2011 |
| JP | 2006-36166 | 2/2006 |
| JP | 2008-116704 | 5/2008 |

OTHER PUBLICATIONS

U.S. Appl. No. 13/292,898, filed Nov. 9, 2011 entitled "Marketplace for Advertisement Space Using Gaze-Data Valuation."
U.S. Appl. No. 13/292,904, filed Nov. 9, 2011 entitled "Real-Time Targeting of Advertisements Based on Gaze Data."
U.S. Appl. No. 13/292,909, filed Nov. 9, 2011 entitled "Individualized Gaze Valuation Based on Gaze Data."
U.S. Appl. No. 13/292,893, filed Nov. 9, 2011 entitled "Valuing Advertisement Space Based on Gaze Data."

* cited by examiner

*Primary Examiner* — M Good Johnson
(74) *Attorney, Agent, or Firm* — McDonnell Boehnen Hulbert & Berghoff LLP

(57) ABSTRACT

Methods and systems are disclosed herein that may help to present graphics in a see-through display of a head-mountable display. An exemplary method may involve: (a) receiving image data that is indicative of a real-world field of view associated with a head-mountable display (HMD); (b) analyzing the image data to determine at least one undesirable portion of the real-world field of view, wherein the at least one undesirable portion is undesirable as a background for display of at least one graphic object in a graphic display of the HMD; (c) determining at least one undesirable area of the graphic display that corresponds to the at least one undesirable portion of the real-world field of view; and (d) causing the at least one graphic object to be displayed in an area of the graphic display such that the graphic object substantially avoids the at least one undesirable area.

21 Claims, 6 Drawing Sheets

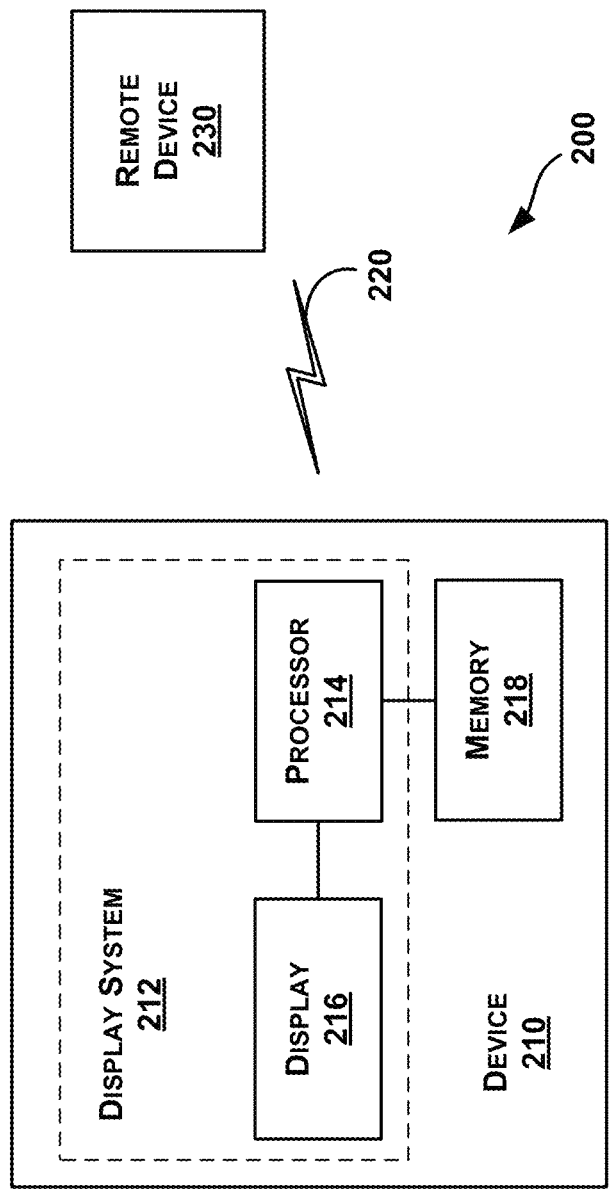

DISPLAY METHOD

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method involves: (a) receiving image data that is indicative of a real-world field of view associated with a head-mountable display (HMD); (b) analyzing the image data to determine at least one undesirable portion of the real-world field of view, wherein the at least one undesirable portion is undesirable as a background for display of at least one graphic object in a graphic display of the HMD; (c) determining at least one undesirable area of the graphic display that corresponds to the at least one undesirable portion of the real-world field of view; and (d) causing the at least one graphic object to be displayed in an area of the graphic display such that the graphic object substantially avoids the at least one undesirable area.

In another aspect, an exemplary system includes a non-transitory computer-readable medium and program instructions stored on the non-transitory computer-readable medium. The program instructions are executable by at least one processor to: (a) receive image data that is indicative of a real-world field of view associated with a head-mountable display (HMD); (b) analyze the image data to determine at least one undesirable portion of the real-world field of view, wherein the at least one undesirable portion is undesirable as a background for display of at least one graphic object in a graphic display of the HMD; (c) determine at least one undesirable area of the graphic display that corresponds to the at least one undesirable portion of the real-world field of view; and (d) cause the at least one graphic object to be displayed in an area of the graphic display such that the graphic object substantially avoids the at least one undesirable area.

In a further aspect, an exemplary non-transitory computer-readable medium has program instructions stored thereon that are executable by at least one processor. The program instructions include: (a) instructions for receiving image data that is indicative of a real-world field of view associated with a head-mountable display (HMD); (b) instructions for analyzing the image data to determine at least one undesirable portion of the real-world field of view, wherein the at least one undesirable portion is undesirable as a background for display of at least one graphic object in a graphic display of the HMD; (c) instructions for determining at least one undesirable area of the graphic display that corresponds to the at least one undesirable portion of the real-world field of view; and (d) instructions for causing the at least one graphic object to be displayed in an area of the graphic display such that the graphic object substantially avoids the at least one undesirable area.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2 illustrates a schematic drawing of a computing device according to an exemplary embodiment.

DETAILED DESCRIPTION

Figure 1A:
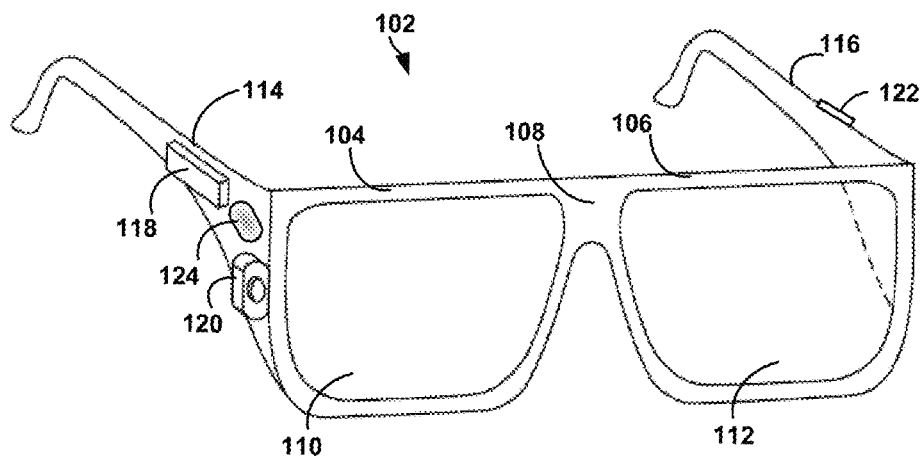
FIG. 1A illustrates a wearable computing system according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

An exemplary embodiment may be implemented in the context of a glasses-style head-mountable display (HMD) with a "see-through" display. In such an HMD, a wearer may simultaneously perceive their real-world surroundings and graphics that are displayed in the see-through display. Consequently, a wearer's real-world surroundings may serve as the background for graphics. As such, there may be times when certain aspects of a wearer's surroundings provide a less-than-ideal background for certain graphics. For example, red text may be difficult to make out if it is displayed such that it appears over a red wall. As another example, light shining through part of the see-through display may make it difficult to perceive graphics displayed in that part of the display. Accordingly, exemplary embodiments may help to identify areas of a display where display of graphics is undesirable, so that the graphics can be displayed elsewhere.

More specifically, an exemplary HMD may utilize a forward-facing (e.g., point-of-view (POV)) camera, which is configured to capture still images and/or video that are indicative of what the wearer is viewing. As such, the HMD may analyze point-of-view image data from its camera to determine portions in the field of view that are undesirable as a background for graphics in its see-through display. Accordingly, the HMD may consider areas in the see-through display that align with undesirable portions in the wearer's field of view to be undesirable for displaying graphics, and responsively avoid these areas of the display.

In some cases, an area of the HMD's display may be considered universally undesirable, for all types of graphics. For instance, a bright light being perceived through a certain area of the display may detract from almost any graphics displayed in that area. Further, in some embodiments, areas of the display that are aligned in the wearer's view with certain patterns, such as a pattern associated with a human face, may be deemed undesirable for display of some or all graphics.

In other cases, an area of the HMD's display may be considered undesirable for graphics having certain characteristics. In particular, an undesirable area of the display may be identified as such based on the relationship between the visual characteristics of the graphics to be displayed, and the visual characteristics of the wearer's real-world environment that is aligned with the area in the wearer's field of view.

For example, graphics of a certain color may not overlay well on a real-world background of the same color or of another color or pattern that does not provide for adequate contrast. However, the other color or pattern may provide an adequate backdrop for graphics of another color or of another type. Accordingly, an HMD may take into account the relationship between the color(s) and/or patterns of the graphics and the colors and/or patterns of the real-world background aligned with the graphics to determine when there is an undesirable area for display of the graphics. (Note that this analysis could involve determining that a specific color or pattern does not work well with another color or pattern, or could involve looking at the contrast between the colors and/or patterns (e.g., bright/dark analysis).)

Note that the graphics for which an exemplary method is applied may take on many forms. For example, the graphics could be text, a picture, a movie, an entire user interface, and so on. Accordingly, visual characteristics that are evaluated may vary depending upon the type of graphics. For instance, a high-motion background may provide an adequate background for non-moving graphics, such as text. However, a high-motion background may render a movie difficult to perceive. Thus, an HMD may determine that an area of the see-through display that is aligned in the wearer's view with a high-motion real-world background is undesirable for a movie, but not for text.

It should be understood that the examples above and elsewhere herein are provided for illustrative purposes, and that many other examples and variations on the described examples are possible.

II. Exemplary Wearable Computing Devices

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

FIG. 1A illustrates a wearable computing system according to an exemplary embodiment. In FIG. 1A, the wearable computing system takes the form of a head-mounted device (HMD) 102 (which may also be referred to as a head-mounted display). It should be understood, however, that exemplary systems and devices may take the form of or be implemented within or in association with other types of devices, without departing from the scope of the invention. As illustrated in FIG. 1A, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the HMD 102 may connect to or be affixed within a head-mounted helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
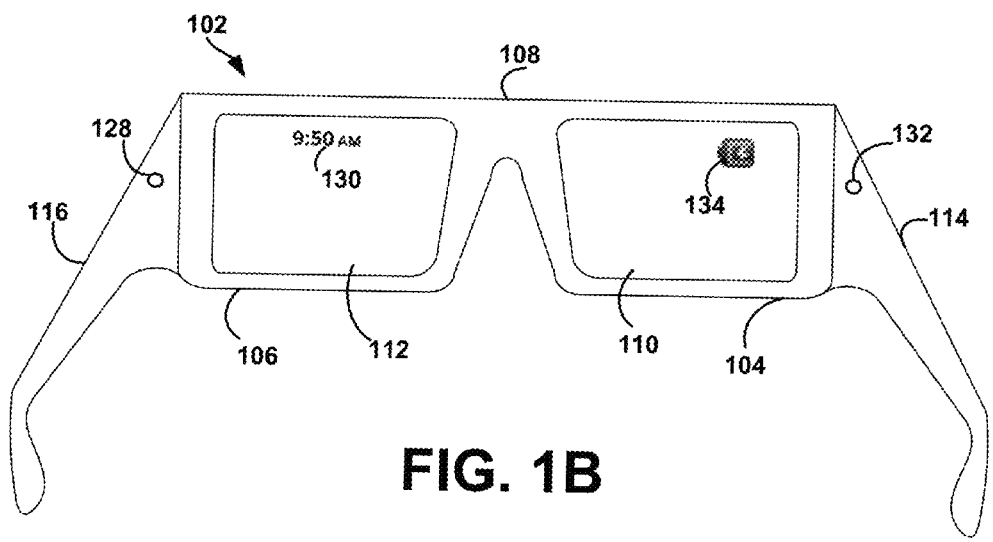
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
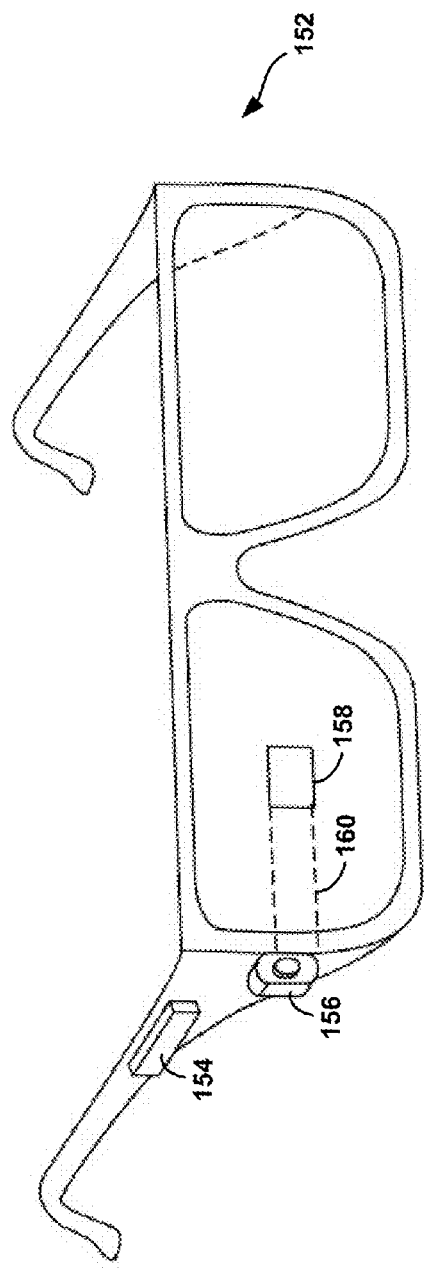
FIG. 1C illustrates another wearable computing system according to an exemplary embodiment.

FIG. 1C illustrates another wearable computing system according to an exemplary embodiment, which takes the form of an HMD 152. The HMD 152 may include frame elements and side-arms such as those described with respect to FIGS. 1A and 1B. The HMD 152 may additionally include an on-board computing system 154 and a video camera 156, such as those described with respect to FIGS. 1A and 1B. The video camera 156 is shown mounted on a frame of the HMD 152. However, the video camera 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
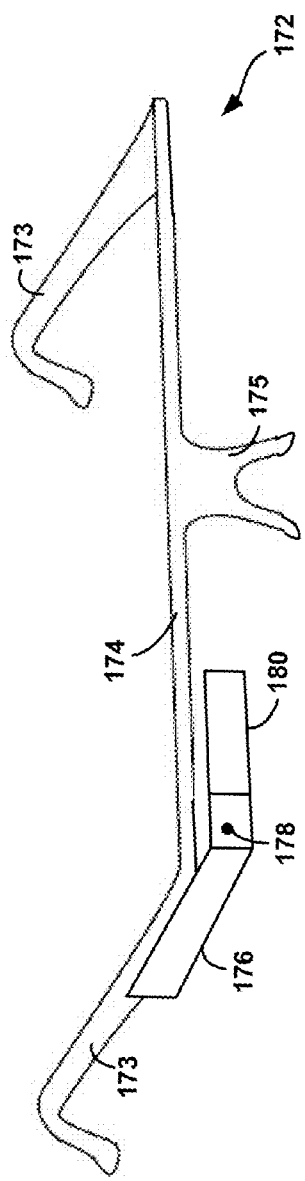
FIG. 1D illustrates another wearable computing system according to an exemplary embodiment.

FIG. 1D illustrates another wearable computing system according to an exemplary embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

FIG. 2 illustrates a schematic drawing of a computing device according to an exemplary embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Exemplary Methods

Figure 3:
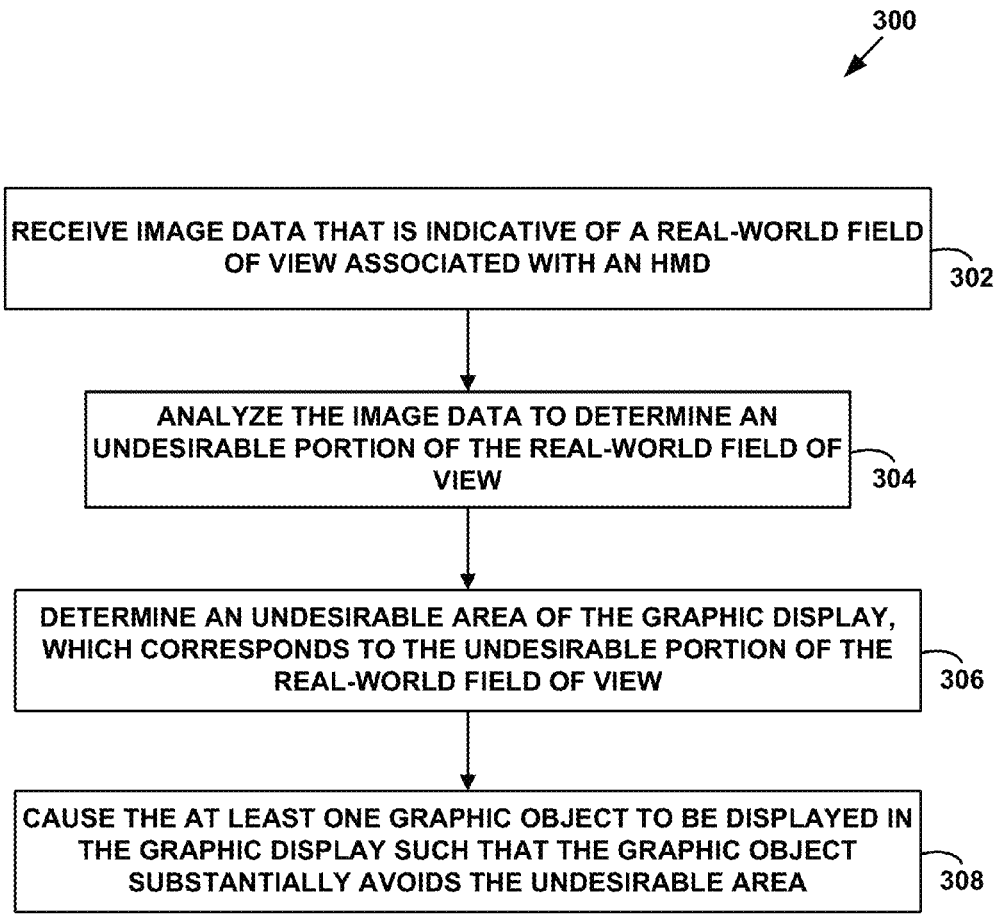
FIG. 3 is a simplified flow chart illustrating a computer-implemented method, according to an exemplary embodiment

FIG. 3 is a simplified flow chart illustrating a computer-implemented method 300, according to an exemplary embodiment. For purposes of illustration, some exemplary functions, such as those of method 300, may be described by way of example as being carried out by a computing system. Such a computing system may take various forms. For example, a method may be carried out by a cloud-based server system that receives and analyzes point-of-view image data from an HMD and/or by a computing system that is operable to communicate with such a server. Other computing systems or combinations of computing systems may also carry out an exemplary method, without departing from the scope of the invention. For example, an exemplary method, or portions thereof, may be carried out by an HMD or another device or system in communication with an HMD. Other implementations are possible as well.

As shown by block 302, method 300 involves a computing system receiving image data that is indicative of a real-world field of view associated with an HMD. The computing system then analyzes the image data to determine an undesirable portion of the real-world field of view, which is undesirable as a background for display of at least one graphic object in a graphic display of the HMD, as shown by block 304. Further, the computing system determines an undesirable area of the graphic display, which corresponds to the undesirable portion of the real-world field of view, as shown by block 306. The computing system may then cause the at least one graphic object to be displayed in the graphic display such that the graphic object substantially avoids the undesirable area, as shown by block 308.

The image data received at block 302 may take various forms. For example, the image data may be one or more still images and/or video captured by a point-of-view camera attached to the HMD. Other types of image data are also possible.

Further, an exemplary method may be implemented to determine undesirable area(s) for various types of graphics. Further, the graphics for which an exemplary method is implemented may include a graphic object or multiple graphic objects. For example, undesirable areas of a see-through display may be identified for text, images, movies, an entire user interface or a portion thereof, and/or an entire application window or a portion thereof, among other possibilities.

In another aspect, an exemplary method may be implemented periodically or continually in order to determine areas to avoid when new graphics are displayed. Additionally or alternatively, an exemplary method may be implemented periodically or continually in order to determine whether graphics that are already being displayed are located in an area that has become undesirable, so that the graphics can be moved to a new area of the display.

A. Determining Undesirable Portions of the Field of View

Note that in order to determine the undesirable portion of the real-world field of view at block 304, the computing system may assume that the image data is indicative of the real-world field of view of a person who is wearing the HMD. Therefore, the determination of the undesirable portion of the wearer's real-world field of view may involve the computing system identifying an area in one or more still images or video frames that has a visual characteristic that is defined as undesirable.

Further, at block 304, the undesirable portion of the real-world field-of-view may be determined based on various amounts of past image data. For example, the computing system may analyze a video segment of a predetermined length (e.g., the last five seconds or last thirty seconds). An area of the video may then be identified as undesirable if an undesirable characteristic is detected at or near the area in at least a threshold number or threshold percentage of frames during the segment. A similar process may be implemented using a sequence of still images instead of video frames.

Yet further, at block 304, various visual characteristics may be considered undesirable as a background for display of graphics a graphic display of an HMD. For example, in some cases, a certain visual characteristic may be defined as being generally undesirable as a background for display of any graphics on a see-through display. For example, in some embodiments, an area where there is a glare from ambient light (e.g., a "sunspot") may be generally undesirable. Thus, graphics may be placed in the see-through display so as to avoid such an area, if possible.

Some visual characteristics may also be defined as being undesirable as a background for a specific graphic object, or for graphic objects having a certain characteristic or certain type of characteristic. Accordingly, to determine the undesirable portion of the real-world field of view at block 304, the computing system may determine that a predetermined relationship exists between at least one visual characteristic of a given portion of the real-world field of view and at least one visual characteristic of the at least one graphic object. For example, a light-colored area in the wearer's field of view may be considered undesirable as a background for display of light-colored graphics, but may be acceptable for darker graphics. Other examples are possible.

In a further aspect, an exemplary method 300 may involve a computing system determining a single undesirable portion of the real-world field of view and/or a single undesirable area of the graphic display. Alternatively, exemplary method 300 can involve a computing system determining that multiple undesirable portions of the real-world field of view exist concurrently, and/or that multiple undesirable areas in the graphic display exist concurrently. In this case, the undesirable portions of the field of view and/or the undesirable areas of the display may be identified as undesirable for the same reason or for different reasons (e.g., based on different visual characteristics and/or different relationships between visual characteristics of the real-world field of view and visual characteristics of the graphic objects to be displayed in the display).

Figure 4:
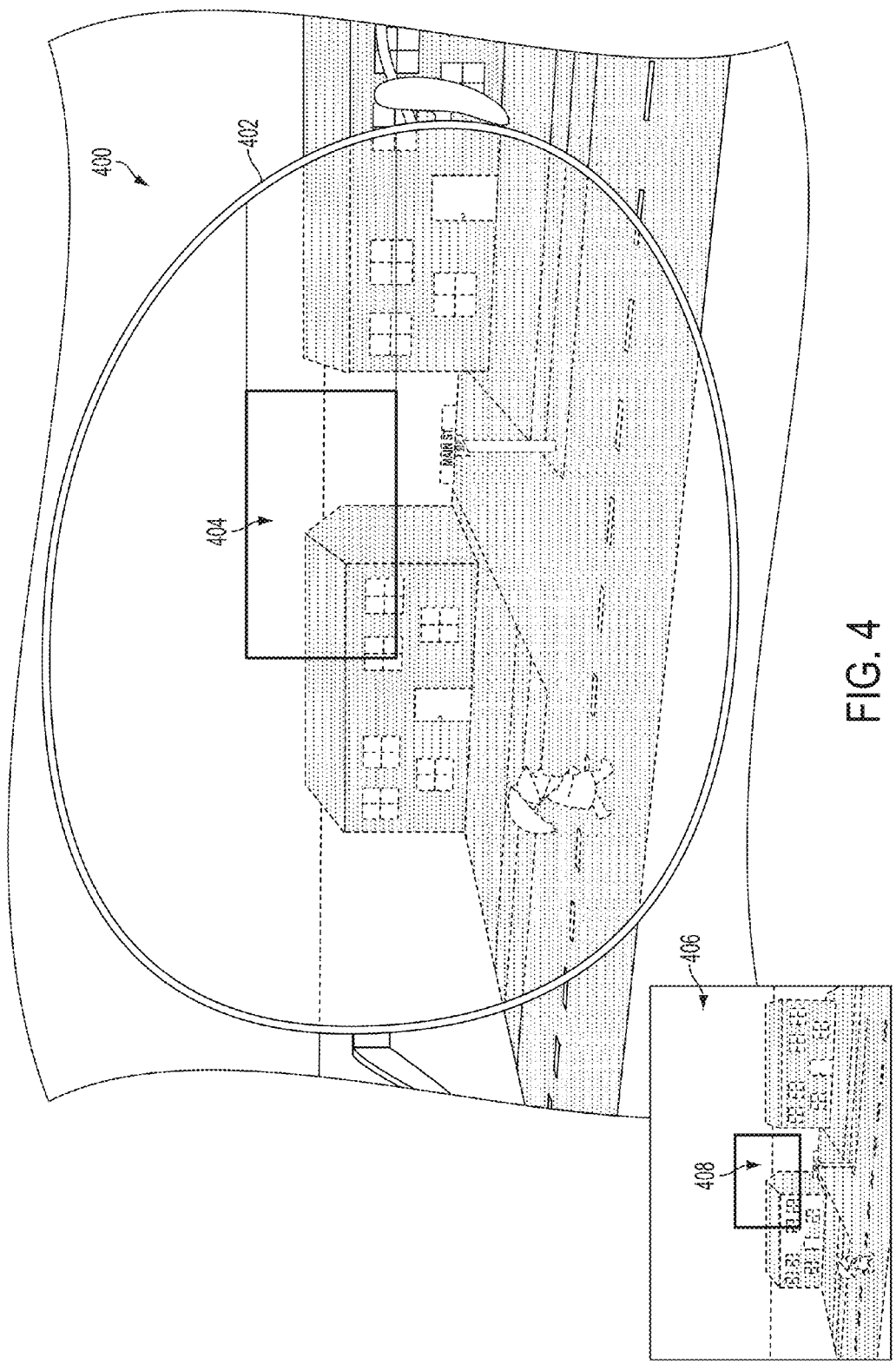
FIG. 4 is a simplified illustration of a real-world field of view, according to an exemplary embodiment.

In some embodiments, at block 304, the computing system may only analyze a portion of a video or still image that corresponds to the portion of the field-of-view that typically serves as the background to a see-through display of an HMD. For example, FIG. 4 is a simplified illustration of a real-world field of view 400, according to an exemplary embodiment. FIG. 4 also shows an HMD 402 from a perspective of a wearer (not shown), as well as a frame 406 of point-of-view video that is captured by the HMD camera (not shown). In the illustrated scenario, a portion of the HMD wearer's real-world field of view 400 may be viewed through a see-through display 404 of the HMD 402. Accordingly, the HMD may determine a certain portion 408 of the video frame 406, which corresponds to the portion of the real-world field of view that serves as the background to the see-through display 404.

B. Determining an Area of a See-Through Display Corresponding to an Undesirable Portion of the Field of View While a point-of-view camera may be mounted on an HMD such that it is close to the wearer's eye, the camera will typically be at least some distance from the eye. Thus, the camera may not be perfectly aligned with the HMD wearer's line of sight through a see-through display, and the perspective captured by the camera may differ to some extent from the wearer's perspective. For example, in FIG. 1C, camera 156 is offset slightly from see-through display 158. Other examples are also possible.

Therefore, in a further aspect, an exemplary embodiment may take into account a difference between the perspective provided by the camera on the HMD may and the wearer's actual field of view through the HMD's see-through display. In order to help correct for this difference, the HMD and/or a server system supporting the HMD may calculate an offset based on the distance between the user's eye and the camera and/or an angle between the user's line of sight to the see-through display and the camera's alignment. (Note that this offset may be predetermined, or may be calibrated periodically.) This offset may then be applied to an undesirable portion of the field of view, as identified in the video from the HMD's camera, in order to determine the corresponding area in the see-through display.

When the computing system limits its analysis to the portion of the image data that corresponds to the real-world background, such as is described above, the size (e.g., area) and location of this portion may be determined based on the positioning of the display relative to the eye. For instance, the computing system may take into account the distance between the display and or the angular relationship between the eye and the display when determining what portion of a video frame or image to analyze. For example, in some embodiments, the size and location of portion 410 may be determined based at least in part on the distance and/or angle between the wearer's eye and the display (e.g., the angle through which the eye rotates from its position when looking straight ahead in order to look at the display).

In some embodiments, the computing system may attempt to determine an area in the video that exactly corresponds to the wearer's real-world background; or in other words, may determine the specific area of the video for analysis based on a particular distance to the eye, a particular angle to the eye, and/or a particular distance and/or angle between the eye and the camera mounted on the HMD. However, the computing system may also expand its analysis beyond the exactly-corresponding area. For example, the computing system may determine an area of the video for analysis that allows for a range of distances and/or a range of angles between the display of the HMD and the wearer's eye. This may be useful to account for variations in facial shape, slippage of the HMD while being worn, and other scenarios that might cause the HMD to move around on the wearer's face such that the positioning of the camera relative to the eye changes.

C. Examples of Undesirable Visual Characteristics

Figure 5:
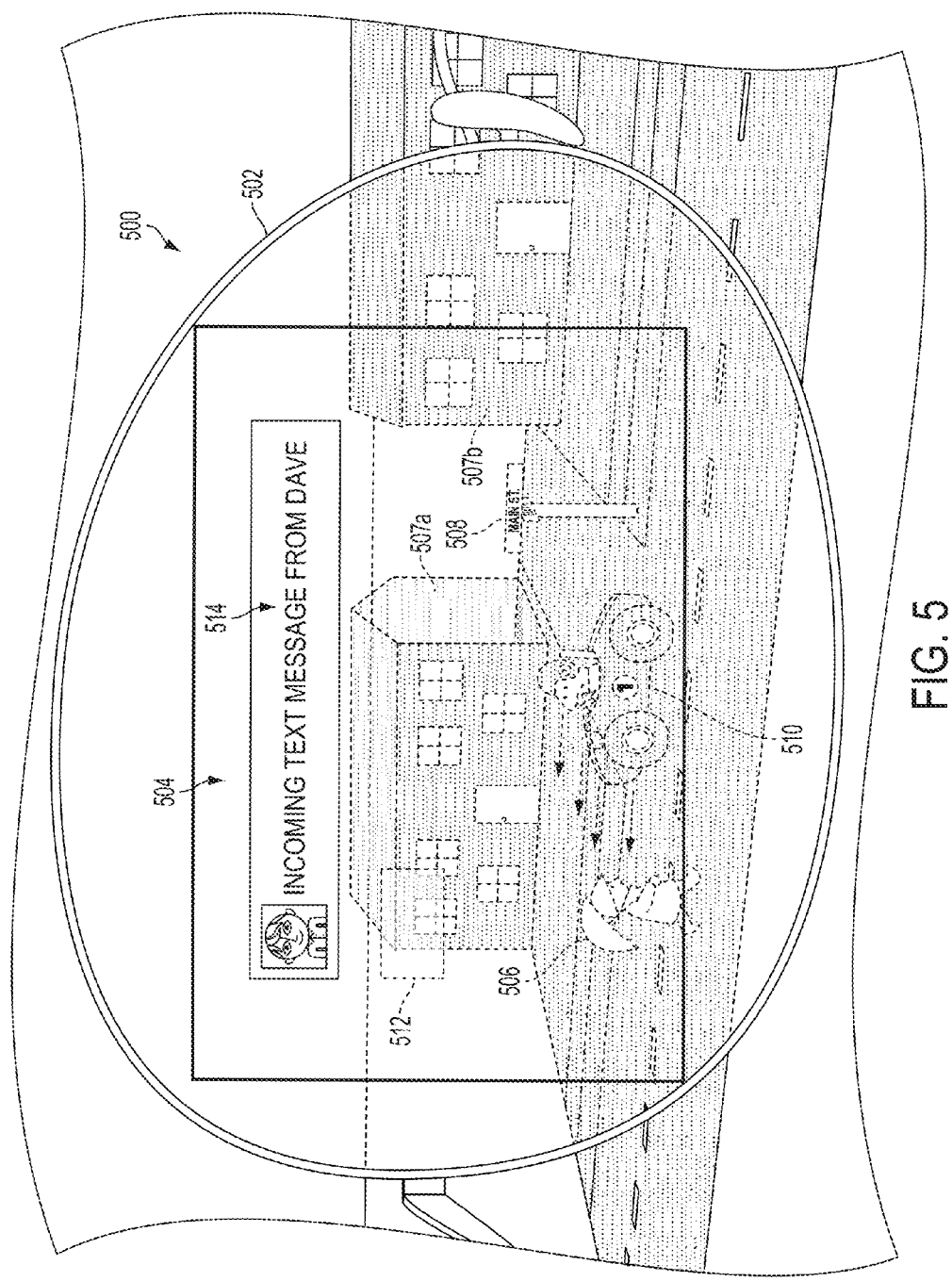
FIG. 5 is a simplified illustration of a real-world field of view, according to an exemplary embodiment.

FIG. 5 is a simplified illustration of a real-world field of view 500, according to an exemplary embodiment. FIG. 5 also shows an HMD 502 from a perspective of a wearer (not shown). The HMD 502 includes a see-through display 504, where it can display graphics. In an exemplary embodiment, the HMD 502 (or a cloud-based server in communication with the HMD 502) may analyze point of view video captured at the HMD to determine that various portions are undesirable as a background for display of graphics.

Avoiding Use of Undesirably-Colored Areas in the Field of View as Background for Graphics In some cases, HMD 502 may be configured to avoid areas having certain coloration. Note that this may involve generally avoiding light or dark areas, or may involve avoiding a specific color or specific colors (e.g., avoiding red, blue, green, yellow, etc.).

For example, consider the scenario where an HMD needs to display a text message to the wearer in a dark-colored font (e.g., black text). In this scenario, the HMD 502 may determine that the darker areas in the field of view 500 (e.g., the house, yard, sidewalk, and street shown within field of view 500) are undesirable as background for display of the text message in the see-through display 504. (Note that this is an example where it is the relationship between the characteristic of the field of view and the characteristic of the graphics that results in a portion of the field of view being deemed undesirable; e.g., the darker areas are undesirable for darker text, but might not be undesirable for lighter text.)

Avoiding Use of Undesirably-Patterned Areas in the Field of View as Background for Graphics In some embodiments, the HMD 502 may be configured to avoid certain visual patterns as the background for graphics that are displayed in see-through display 504. In an exemplary embodiment, various types of visual patterns may therefore be predefined as being undesirable as a background for the graphics that are displayed in see-through display 504. (Note that a given pattern may be defined as being generally undesirable as a background for any graphics, or may be defined as being undesirable only for particular graphics or for a particular type of graphics.)

In one aspect, complicated or "busy" visual patterns may be considered undesirable as the background for graphics. For example, HMD 502 may avoid placing graphics over complicated background scenery, such as the bricks of houses 507a and 507b. Other examples are also possible.

In another aspect, visual patterns that identify faces (or people in general) may be considered undesirable as the background for graphics. For example, HMD 502 may be configured to avoid covering faces (or people) with graphics, and thus may consider the person 506 who crossing the road to be an undesirable portion of the wearer's field of view 500. (Note that this is an example where an area may be generally defined as undesirable, without necessarily considering the relationship between the characteristics of the field of view and the characteristic of the graphics to be displayed.)

Further, note that in some cases, any face may be generally defined as undesirable. In other cases, only certain faces may be defined as undesirable. For instance, faces of people having some connection to the wearer, such as people in a wearer's phone or e-mail contact list, or a wearer's "friends" in an online social network, may be defined as undesirable.

In a further aspect, text may be considered a visual pattern that is undesirable as the background for graphics. As such, HMD 502 may be configured to avoid displaying graphics over portions of the wearer's field of view that include text. For example, in field of view 500, the street sign 508 includes the text "MAIN ST." Accordingly, HMD 502 may determine that the area of the see-through display 504 that corresponds to the location of the street sign 508 in the wearer's field of view 500, is undesirable for display of graphics.

Avoiding Use of High-Movement Areas in the Field of View as Background for Graphics In some embodiments, the HMD 502 may be configured to avoid displaying graphics in areas of see-through display 504 that overlap with high-motion areas in the wearer's field of view. Accordingly, referring back to block 304 of FIG. 3, an exemplary method 300 may involve a computing system analyzing the point of view image data to determine a portion (or portions) of the real-world field of view having more than a threshold level of movement. Such high-movement portions may then be considered undesirable as a background for display of graphics in the HMD's display.

For example, referring again to FIG. 5, HMD 502 may be configured to avoid displaying graphics over high-motion areas in the wearer's field of view 500. As such, HMD 502 may consider the car 510 to be an undesirable portion of the wearer's field of view 500. As a result, HMD 502 may determine that the area of see-through display 504 that corresponds to car 510 in the wearer's field of view 500 is undesirable for the display of graphics.

Note that various techniques may be utilized to identify high-motion areas in the wearer's field of view. For example, optical-flow analysis may be performed on point-of-view video captured by the HMD's camera. The resulting optical flow may then be evaluated to identify areas of high movement. Other optical-flow-based techniques are also possible.

Further, various other techniques may also be used to identify high-motion areas, in addition or in the alternative to optical-flow based techniques. For example, simple pixel (or sub-region) frame differencing techniques could be applied to determine motion based on changes between video frames or sequential still images captured by a camera on an HMD. The amount of motion could then be compared to a threshold amount of motion, which may be defined universally, or for particular graphics. An area may then be deemed to be undesirable when the determined motion in the area is greater than the threshold amount. Other techniques are possible as well.

Avoiding Use of Noisy Areas in the Field of View as Background for Graphics

In some embodiments, the HMD 502 may be configured to avoid displaying graphics in areas of see-through display 504 that overlap with a noisy area in the wearer's field of view. For example, referring back to block 304 of FIG. 3, an exemplary method 300 may involve a computing system analyzing the point of view image data to determine a portion (or portions) of the real-world field of view having a high-frequency visual signature that is indicative of more than a certain amount of noise. Such high-noise portions may then be considered undesirable as a background for display of graphics in the HMD's display.

Various techniques may be used to determine the high-frequency visual signature of a portion of the real-world field of view. For instance the HMD may measure the strength of the high-frequency part of a video frame or a still image, and determine that the strength in a given portion of the frame or image indicates a certain amount of noise in the given portion. To do so, the HMD may take the Fourier transform of a point-of-view video frame or image, or may apply wavelet decomposition to the frame or image. The HMD may then sum the amplitudes of a higher-frequency range of the transform to determine a high-frequency visual signature for the frame of image.

In some implementations, a portion of the field of view may be labeled as undesirable after detecting high-frequency visual signature that is beyond a threshold in a single point-of-view frame or image. In other implementations, the HMD may require that a high-noise area be detected for at least a certain period of time or in at least a certain number of frames, before concluding that the area is undesirable. In such an implementation, the HMD may require that noise is detected in an area continuously in order to label the area as undesirable. However, an HMD also could also label an area as a high-noise area when the high-frequency visual signature exceeds a threshold for a certain percentage of the time or a certain percentage of the previous frames (e.g., in 7 or more of the previous 10 frames).

Avoiding Ambient-Light Interference with Graphics on See-Through Display

In some embodiments, the HMD 502 may be configured to avoid displaying graphics in areas of see-through display 504 that align with portions of the wearer's field of view having levels of ambient light that could make it difficult to perceive graphics on the see-through display. Accordingly, referring back to block 304 of FIG. 3, an exemplary method 300 may involve a computing system analyzing the point of view image data to determine a portion (or portions) of the real-world field of view having more than a threshold level of ambient light. Such portions may then be considered undesirable as a background for display of graphics in the HMD's display.

For example, HMD 502 may analyze point-of-view video from the HMD's camera and detect that glare exists at area 512 within the wearer's field of view 500. Accordingly, the area of see-through display 504 corresponding to area 512 in the wearer's field of view 500 may be determined to be undesirable for display of graphics. Other examples are possible as well.

D. Displaying Graphics so as to Avoid the Undesirable Area in the Display

Referring back to block 308 of method 300, an exemplary method may involve an HMD displaying graphics so as to substantially avoid an undesirable area in its see-through display.

In some embodiments, the HMD may simply display graphics in an area that avoids (e.g., does not overlap with) the undesirable area(s) in the display. Further, when there are multiple undesirable areas in the display, the HMD may substantially avoid all the undesirable areas.

For example, referring to FIG. 5, consider the scenario where HMD 502 is about to display a graphic notification for an incoming text message. The HMD 502 may determine, for reasons such as those described above, that it is undesirable to display the graphic notification in an area of the display 504 that aligns in the wearer's field of view 500 with: (a) dark-colored streets and lawns, (b) person 506, (c) houses 507a and 507b, (d) street sign 508, and (e) car 510. Accordingly, the HMD 502 may avoid the undesirable areas, and display the graphic notification 514 in the location such shown in FIG. 5, which does not overlap with the undesirable areas. It should be understood that the location of graphic notification 514 in FIG. 5 is but one example, and that other locations are possible.

In a further aspect, block 308 may further involve determining a size for the graphics to be displayed. In particular, graphics may be sized so as to substantially fit in an area of the display that avoids undesirable area(s).

In some instances, an exemplary method may result in graphics that are already displayed being moved to a new location in the see-through display, so as to avoid an area or areas of the display that have become undesirable. As such, block 308 of method 300 may involve the computing system causing the at least one graphic object to be moved to a new area of the display, which substantially avoids undesirable area(s). Such movement of graphics may be rendered in various ways. For example, movement of graphics from a location that overlaps with an undesirable area to a new location that substantially avoids undesirable area(s) may be rendered such that the movement appears smooth and continuous to the wearer. Alternatively, graphics may be removed from a location that overlaps with an undesirable and re-displayed at a new location that substantially avoids undesirable area(s), such that the graphics appear to "jump" to the new location.

As another example, instead of moving from a location that overlaps with an undesirable area to a new location that substantially avoids undesirable area(s), an exemplary embodiment may involve modifying the graphics so that the background is no longer undesirable for the particular graphics. For instance, when the color of a real-world background becomes undesirable for graphics that are being displayed by an HMD, the HMD may change the color of graphics such that the relationship between the color of the graphics and the color of the real-world background is no longer considered undesirable. Other examples are also possible.

Note that in some embodiments, certain, small amounts of overlap with an undesirable area may be allowed. The amount of allowable overlap may be selected to, e.g., balance the need for flexibility and continuity in displaying information in a see-through display with the goal of presenting the information in the manner that is most easily perceived by the viewer. Other considerations when selecting an amount of allowable overlap are possible as well.

It should be understand that the terms "head-mounted display" and "head-mountable display" can be used interchangeably. In particular, both terms refer to a wearable device that, when worn, provides at least one near-eye display. It should be further understood that such a device may be considered to be a "head-mounted display" whether it is worn or not; i.e., such a device mountable and thus may or may not be worn at any given point in time.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
receiving image data that is indicative of a real-world field of view associated with a head-mountable display (HMD);
analyzing the image data to determine at least one undesirable portion of the real-world field of view, wherein the at least one undesirable portion is undesirable as a background for display of at least one graphic object in a graphic display of the HMD, and wherein analyzing the image data to determine the at least one undesirable portion of the real-world field of view comprises determining a portion of the real-world field of view having more than a threshold level of ambient light;
determining at least one undesirable area of the graphic display that corresponds to the at least one undesirable portion of the real-world field of view; and
causing the at least one graphic object to be displayed in an area of the graphic display such that the graphic object substantially avoids the at least one undesirable area that corresponds to the portion of the real-world field of view having more than the threshold level of ambient light.

2. The method of claim 1, wherein analyzing the image data to determine the at least one undesirable portion of the real-world field of view further comprises determining that a predetermined relationship exists between at least one visual characteristic of a given portion of the real-world field of view and at least one visual characteristic of the at least one graphic object.

3. The method of claim 1, wherein analyzing the image data to determine the at least one undesirable portion of the real-world field of view comprises analyzing one or more point-of-view images from a camera that is attached to the HMD.

4. A computer-implemented method comprising:
receiving image data that is indicative of a real-world field of view associated with a head-mountable display (HMD);
analyzing the image data to determine at least one undesirable portion of the real-world field of view, wherein the at least one undesirable portion is undesirable as a background for display of at least one graphic object in a graphic display of the HMD, wherein analyzing the image data to determine the at least one undesirable portion of the real-world field of view comprises determining a portion of the real-world field of view having at least a first color with an undesirable relationship to at least a second color that is present in the at least one graphic object;
determining at least one undesirable area of the graphic display that corresponds to the at least one undesirable portion of the real-world field of view; and
causing the at least one graphic object to be displayed in an area of the graphic display such that the graphic object substantially avoids the at least one undesirable area that corresponds to the portion of the real-world field of view having at least the first color with the undesirable relationship to at least the second color that is present in the at least one graphic object.

5. A computer-implemented method comprising:
receiving image data that is indicative of a real-world field of view associated with a head-mountable display (HMD);
analyzing the image data to determine at least one undesirable portion of the real-world field of view, wherein the at least one undesirable portion is undesirable as a background for display of at least one graphic object in a graphic display of the HMD, and wherein analyzing the image data to determine the at least one undesirable portion of the real-world field of view comprises determining a portion of the real-world field of view having a particular visual pattern with an undesirable relationship to a visual aspect of at least one graphic object;
determining at least one undesirable area of the graphic display that corresponds to the at least one undesirable portion of the real-world field of view; and
causing the at least one graphic object to be displayed in an area of the graphic display such that the graphic object substantially avoids the at least one undesirable area that corresponds to the portion of the real-world field of view having the particular visual pattern with the undesirable relationship to the visual aspect of the at least one graphic object.

6. The method of claim 5, wherein the particular visual pattern is a pattern corresponding to a face.

7. A computer-implemented method comprising:
receiving image data that is indicative of a real-world field of view associated with a head-mountable display (HMD);
analyzing the image data to determine at least one undesirable portion of the real-world field of view, wherein the at least one undesirable portion is undesirable as a background for display of at least one graphic object in a graphic display of the HMD; and wherein analyzing the image data to determine the at least one undesirable portion of the real-world field of view comprises determining at least one portion of the real-world field of view having more than a threshold level of movement;
determining at least one undesirable area of the graphic display that corresponds to the at least one undesirable portion of the real-world field of view; and
causing the at least one graphic object to be displayed in an area of the graphic display such that the graphic object substantially avoids the at least one undesirable area that corresponds to the at least one portion of the real-world field of view having more than the threshold level of movement.

8. A system comprising:
a non-transitory computer-readable medium; and
program instructions stored on the non-transitory computer-readable medium and executable by at least one processor to:
receive image data that is indicative of a real-world field of view associated with a head-mountable display (HMD);
analyze the image data to determine at least one undesirable portion of the real-world field of view, wherein the at least one undesirable portion is undesirable as a background for display of at least one graphic object in a graphic display of the HMD, and wherein the at least one undesirable portion of the real-world field of view comprises a portion of the real-world field of view having more than a threshold level of ambient light;
determine at least one undesirable area of the graphic display that corresponds to the at least one undesirable portion of the real-world field of view; and
cause the at least one graphic object to be displayed in an area of the graphic display such that the graphic object substantially avoids the at least one undesirable area that corresponds to the portion of the real-world field of view having more than the threshold level of ambient light.

9. The method of claim 8, wherein the program instructions stored on the non-transitory computer-readable medium and executable by at least one processor to analyze the image data to determine the at least one undesirable portion of the real-world field of view comprise:
program instructions stored on the non-transitory computer-readable medium and executable by at least one processor to analyze the image data to determine a portion of the real-world field of view having a predetermined visual characteristic.

10. The system of claim 9, wherein the predetermined visual characteristic is a particular color.

11. The system of claim 9, wherein the predetermined visual characteristic is a particular visual pattern.

12. The system of claim 11, wherein the particular visual pattern is a pattern corresponding to a face.

13. The system of claim 8, wherein the program instructions stored on the non-transitory computer-readable medium and executable by at least one processor to analyze the image data to determine the at least one undesirable portion of the real-world field of view comprise:
program instructions stored on the non-transitory computer-readable medium and executable by at least one processor to determine at least one portion of the real-world field of view having more than a threshold level of movement.

14. The system of claim 8, wherein the program instructions stored on the non-transitory computer-readable medium and executable by at least one processor to analyze the image data to determine the at least one undesirable portion of the real-world field of view comprise:
program instructions stored on the non-transitory computer-readable medium and executable by at least one processor to determine that a predetermined relationship exists between at least one visual characteristic of a given portion of the real-world field of view and at least one visual characteristic of the at least one graphic object.

15. A non-transitory computer-readable medium having program instructions stored thereon that are executable by at least one processor, the program instructions comprising:
instructions for receiving image data that is indicative of a real-world field of view associated with a head-mountable display (HMD);
instructions for analyzing the image data to determine at least one undesirable portion of the real-world field of view, wherein the at least one undesirable portion is undesirable as a background for display of at least one graphic object in a graphic display of the HMD, wherein analyzing the image data to determine the at least one undesirable portion comprises determining at least one portion of the real-world field of view having more than a threshold level of movement;
instructions for determining at least one undesirable area of the graphic display that corresponds to the at least one undesirable portion of the real-world field of view; and
instructions for causing the at least one graphic object to be displayed in an area of the graphic display such that the graphic object substantially avoids the at least one undesirable area that corresponds to the at least one portion of the real-world field of view having more than the threshold level of movement.

16. The computer-readable medium of claim 15, wherein the instructions for analyzing the image data to determine the at least one undesirable portion of the real-world field of view comprise instructions for determining a portion of the real-world field of view having more than a threshold level of ambient light.

17. The computer-readable medium of claim 15, wherein the instructions for analyzing the image data to determine the at least one undesirable portion of the real-world field of view comprise instructions for determining a portion of the real-world field of view having a predetermined visual characteristic.

18. The computer-readable medium of claim 17, wherein the predetermined visual characteristic is a particular color.

19. The computer-readable medium of claim 17, wherein the predetermined visual characteristic is a particular visual pattern.

20. The computer-readable medium of claim 19, wherein the particular visual pattern is a pattern corresponding to a face.

21. The computer-readable medium of claim 15, wherein the instructions for analyzing the image data to determine the at least one undesirable portion of the real-world field of view comprise instructions for determining that a predetermined relationship exists between at least one visual characteristic of a given portion of the real-world field of view and at least one visual characteristic of the at least one graphic object.

* * * * *